US010977484B2

(12) United States Patent
Khanna et al.

(10) Patent No.: US 10,977,484 B2
(45) Date of Patent: Apr. 13, 2021

(54) SYSTEM AND METHOD FOR SMART PRESENTATION SYSTEM

(71) Applicant: Microsoft Technology Licensing, LLC, Redmond, WA (US)

(72) Inventors: Varun Khanna, Hyderabad (IN); Chandra Sekhar Annambhotla, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 15/925,558

(22) Filed: Mar. 19, 2018

(65) Prior Publication Data

US 2019/0286890 A1    Sep. 19, 2019

(51) Int. Cl.
*G06K 9/00* (2006.01)
*G06F 3/0484* (2013.01)
*G06F 16/335* (2019.01)
*G06F 40/103* (2020.01)

(52) U.S. Cl.
CPC ....... *G06K 9/00335* (2013.01); *G06F 3/0484* (2013.01); *G06F 16/337* (2019.01); *G06F 40/103* (2020.01)

(58) Field of Classification Search
CPC . G06K 9/00335; G06F 16/337; G06F 3/0484; G06F 17/211
See application file for complete search history.

(56) References Cited

U.S. PATENT DOCUMENTS

| | | | |
|---|---|---|---|
| 7,296,027 B2 | 11/2007 | Cobb et al. | |
| 8,495,210 B1 | 7/2013 | Natarajan et al. | |
| 8,689,097 B2 | 4/2014 | Varadarajan et al. | |
| 9,460,416 B2 | 10/2016 | Penner | |
| 9,477,380 B2 | 10/2016 | Amijee | |
| 2009/0138332 A1 | 5/2009 | Kanevsky et al. | |
| 2012/0124604 A1 | 5/2012 | Small et al. | |
| 2014/0337868 A1 | 11/2014 | Garza et al. | |
| 2014/0344702 A1 | 11/2014 | Edge et al. | |
| 2016/0011729 A1* | 1/2016 | Flores ..................... | G06F 3/167 715/728 |

(Continued)

*Primary Examiner* — Kunal Langhnoja
(74) *Attorney, Agent, or Firm* — Rainier Patents, P.S.

(57) ABSTRACT

Described herein is a smart presentation system and method. Information identifying participant(s) associated with an electronic presentation document and information regarding a topic of the presentation is received. Participant profile information associated with at the participant(s) is retrieved using the received identification information. An audience profile relative to the topic of the presentation is determined using the retrieved participant profile information and received information regarding the topic of the presentation. A suggestion for the presentation is identified using an algorithm employing stored historical data, the determined audience profile and received information regarding the topic of the presentation.

Further described herein is a presentation adaptation system and method. While presenting a presentation to participant(s), a cognitive expression of participant(s) is detected. Using an algorithm, an engagement level of the participant(s) is determined based upon the detected cognitive expression. A suggestion is provided based upon the determined engagement level.

20 Claims, 7 Drawing Sheets

(56) References Cited

U.S. PATENT DOCUMENTS

| | | |
|---|---|---|
| 2016/0165284 A1 | 6/2016 | Bargagni et al. |
| 2016/0210985 A1 | 7/2016 | Deleeuw |
| 2017/0090845 A1 | 3/2017 | Xu et al. |
| 2017/0093967 A1* | 3/2017 | Grosz ................ H04L 67/1044 |
| 2017/0147154 A1 | 5/2017 | Steiner et al. |
| 2017/0295404 A1* | 10/2017 | Meredith ........... H04N 21/4667 |
| 2018/0088742 A1* | 3/2018 | Lee ...................... H04L 67/306 |
| 2018/0181549 A1* | 6/2018 | Hileman ............. G06F 17/2247 |
| 2018/0205797 A1* | 7/2018 | Faulkner ................ H04L 67/14 |

* cited by examiner

SYSTEM AND METHOD FOR SMART PRESENTATION SYSTEM

BACKGROUND

Presentations provide a focal point that allows a presenter to provide narrative information regarding a topic. For example, a presentation can include a plurality of slides prepared using an application such as PowerPoint® of Microsoft Corporation.

When it is time for the presenter to give the presentation, the slides can be displayed (e.g., sequentially) while the presenter narrates and/or discusses the content of the slides. For example, the slides can be displayed on a single screen within a physical location viewable by participants and/or displayed on a plurality of screens with each screen viewable by one or more participants (e.g., in physically disparate locations and/or displays of computers in a same or different physical location).

SUMMARY

Described herein is a smart presentation system, comprising: a computer comprising a processor and a memory having computer-executable instructions stored thereupon which, when executed by the processor, cause the computer to: while editing an electronic presentation document using a presentation application: receive information identifying one or more participants associated with the electronic presentation document; receive information regarding a topic of the electronic presentation document; retrieve participant profile information associated with at least some of the one or more participants using the received identification information; determine an audience profile relative to the topic of the electronic presentation document using the retrieved participant profile information and received information regarding the topic of the electronic presentation document; identify a suggestion for the electronic presentation document using an algorithm employing stored historical data, the determined audience profile and received information regarding the topic of the electronic presentation document; and provide the suggestion to a user.

Described herein is a computer storage media storing computer-readable instructions that when executed cause a computing device to: while presenting an electronic presentation document to one or more participants by a presenter, detect a cognitive expression of at least one participants; using an algorithm, determine an engagement level of the one or more participants based upon the detected cognitive expression; and, provide a suggestion to the presenter based upon the determined engagement level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to a smart presentation system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding a smart presentation system. What follows are one or more exemplary systems and methods.

Aspects of the subject disclosure pertain to the technical problem of creating an electronic presentation document tailored to a particular audience and/or adapting the electronic presentation document based upon cognitive feedback received while the electronic presentation document is being presented. The technical features associated with addressing this problem involve retrieving participant profile information associated with at least some of the participant(s) using received identification information; receiving information regarding a topic of the electronic presentation document; determining an audience profile relative to the topic of the electronic presentation document of at least some of the participant(s) using the retrieved participant profile information and received information regarding the topic of the electronic presentation document; identifying a suggestion for the electronic presentation document using an algorithm employing stored historical data, the determined audience profile and received information regarding the topic of the electronic presentation document; and providing (e.g., displaying) the suggestion. While an electronic presentation document is being presented, the electronic presentation document can be adapted based upon detected cognitive expression(s) of at least some of the participant(s), and, a suggestion (e.g., regarding more and/or less content) provided to a presenter based upon the detected cognitive expression(s). Accordingly, aspects of these technical features exhibit technical effects of more increasing user efficiency by reducing use of processing time and/or computer resource(s) to create/adapt the electronic presentation document.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Figure 1:
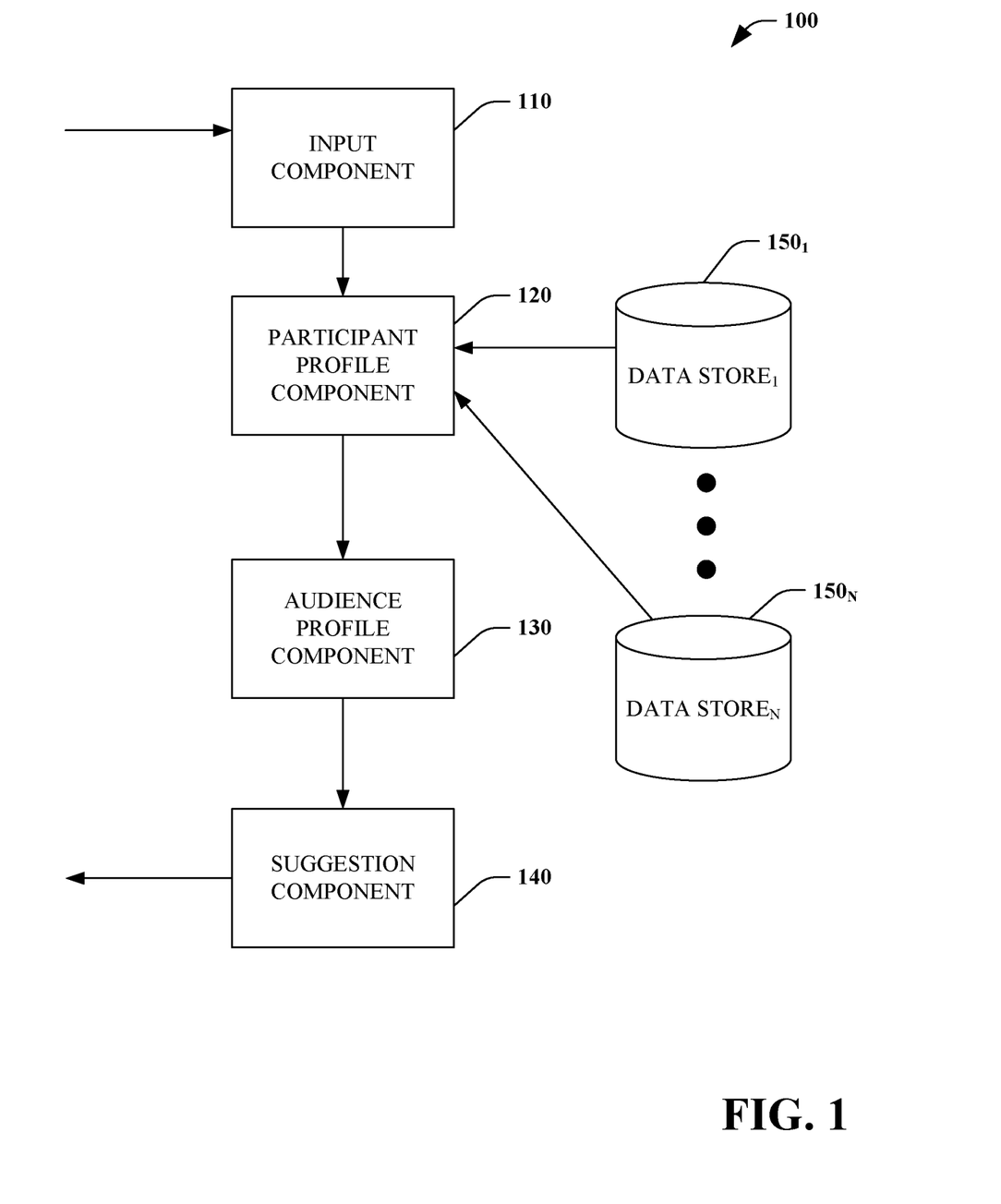
FIG. 1 is a functional block diagram that illustrates a smart presentation system.

Referring to FIG. 1, a smart presentation system 100 is illustrated. The system 100 includes an input component 110, a participant profile component 120, an audience profile component 130 and a suggestion component 140. In some embodiments, the system 100 is a component of a presentation application used to view, generate, and/or edit an electronic presentation document. In some embodiments, the system 100 is a service (e.g., cloud-based service) available to the presentation application.

Figure 2:
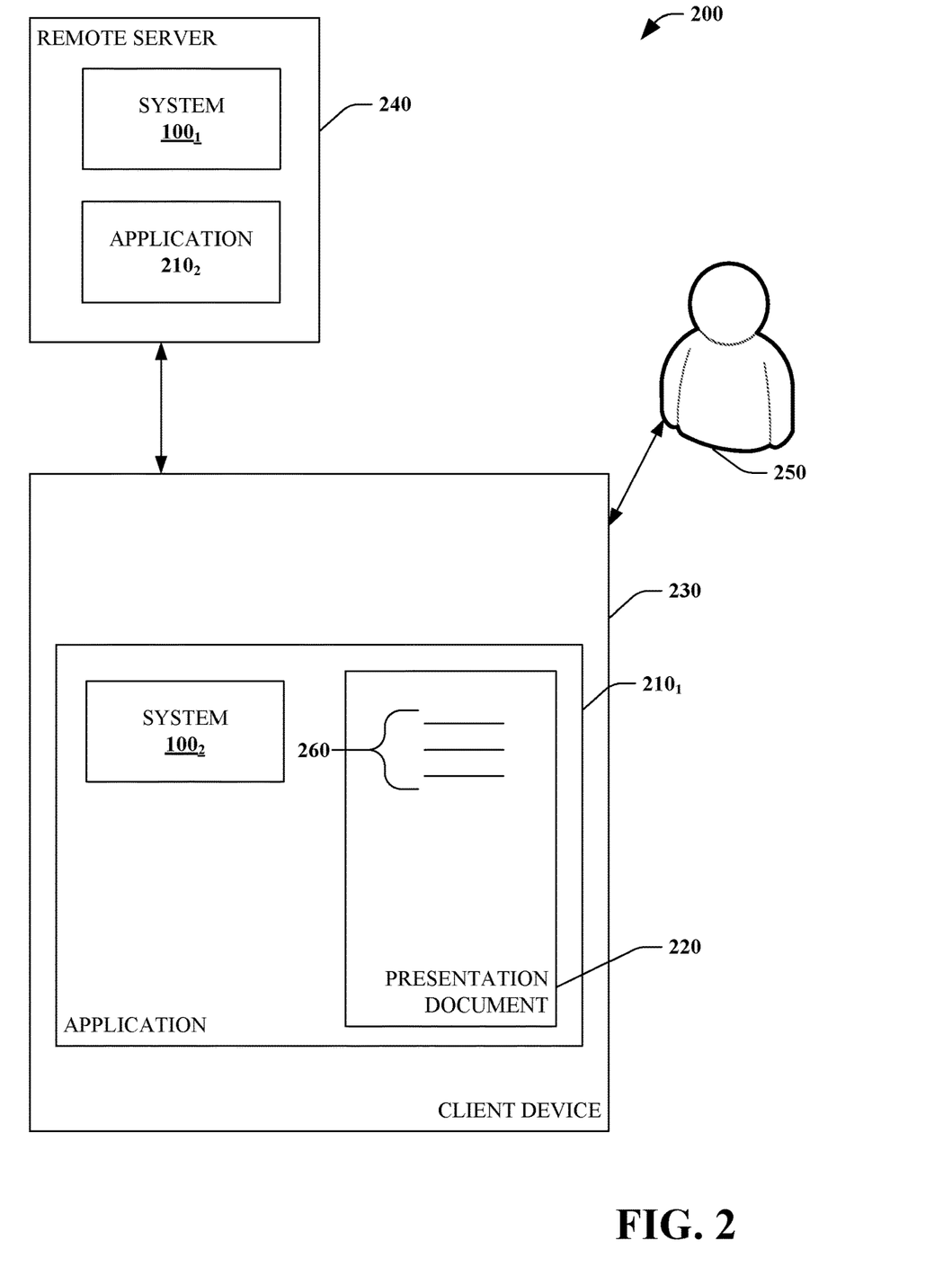
FIG. 2 is a functional block diagram that illustrates a system for creating an electronic presentation document.

Turning briefly to FIG. 2, a system for creating an electronic presentation document 200 is illustrated. The system 200 includes an application $210_1$, $210_2$ (generally, 210) used to view, generate, and/or edit an electronic presentation document 220. Examples of suitable applications 210 include, but are not limited to, word processing, spreadsheet, database, slide presentation, electronic mail, drawing, note taking, web browser, media player, and game applications.

In some embodiments, the application $210_1$ is a thick client application stored locally on a client device 230. In some embodiments, the application $210_2$ is a thin client application (i.e., web applications) that resides on a remote server 240 and accessible over a network or combination of networks (e.g., the Internet, wide area networks, local area networks). A thin client application $210_2$ can be hosted in a browser-controlled environment or coded in a browser-supported language and reliant on a common web browser to render the application executable on the client device 230.

A user 250 can use the application 210 to create a new electronic presentation document 220, edit an existing electronic presentation document 220, and/or view an existing electronic presentation document 220. The application 210 receives input from the user 250, for example, text input, from one or more input devices including, for example, a keyboard, a computer mouse, a remote control. In some embodiments, the application 210 receives input from the user 250 through a Natural User Interface (NUI) which enables the user to interact with the client device 230 in a natural manner. Examples of NUI include speech recognition, touch and stylus recognition, gesture recognition both on screen and adjacent to the screen, air gestures, head and eye tracking, voice and speech, vision, touch, hover, gestures, machine intelligence, and the like.

The user input results in content 260 being added to the electronic presentation document 220. In some embodiments, content 260 is added within a document canvas (e.g., a page in a word processing document, a spreadsheet in a spreadsheet document, a slide in an electronic presentation document) of the electronic presentation document 220.

While creating and/or editing the electronic presentation document 220, the system 100 can receive information (e.g., participant(s), content of electronic presentation document 220, topic, agenda, etc.) from the user 250. Based upon the received information, the system 100 can provide suggestion(s) for the electronic presentation document 220 (e.g., content, template(s), formatting, etc.) to the user 250.

Referring to FIG. 1, with continued reference to FIG. 2, the input component 110 receives information identifying one or more participants associated with the electronic presentation document 220. In some embodiments, the information can be received from the user 250 explicitly. For example, the system 100 can provide a user interface into which the user 250 provides information identifying one or more participants expected to participate (e.g., attend, view, etc.) in the presentation. The identifying information can include names, geographical location information, email addresses, an employee identifier, and the like.

In some embodiments, the identifying information can be received implicitly. For example, with consent of the user 250, the system 100 can obtain information identifying one or more participants from an email message, text message and/or other electronic communication associated with the electronic presentation document 220 (e.g., names, email addresses, etc.).

The input component 110 further receives information regarding a topic of the electronic presentation document 220. In some embodiments, the information regarding the topic can be a word, phrase and/or other high-level abstraction of content of the electronic presentation document 220 (e.g., metadata about the presentation). In some embodiments, the information regarding the topic can be an agenda, outline and/or preliminary slide(s) of the electronic presentation document 220.

In some embodiments, the topic information can be provided explicitly by the user 250, for example, using a graphical user interface. In some embodiments, the topic information can be provided implicitly. For example, with consent of the user 250, the system 100 can obtain topic information from an email, text message and/or other electronic communication associated with the electronic presentation document 220 (e.g., subject of email, content of email, content of text message, content of instant message, etc.).

Once the information identifying participant(s) associated with the electronic presentation document 220 and information regarding the topic of the electronic presentation document 220 have been received, the participant profile component 120 retrieves participant profile information associated with at least some of the participant(s) using the received identification information. The participant profile information can include educational information, work history information, skills, certifications, endorsements, etc.

The participant profile information can be retrieved from one or more data stores 150. In some embodiments, the data stores 150 can include professional and/or social networking websites such as LinkedIn®. In some embodiments, the data stores 150 include a website and/or directory associated with an entity (e.g., educational, corporate, governmental, etc.).

In some embodiments, the participant profile information is retrieved from publically available data stores 150. In some embodiments, the participant profile information is retrieved from private data stores 150 (e.g., not generally available to the public). In some embodiments, the participant profile component 120 removes personally identifiable information from the retrieved participant profile information before providing the retrieved participant profile information to the audience profile component 130.

The audience profile component 130 determines an audience profile relative to the topic of the electronic presentation document 220 using the retrieved participant profile information and received information regarding the topic of the electronic presentation document 220. In some embodiments, the audience profile component 130 utilizes an algorithm that determines an aggregated skill level of the participants with respect to the topic of the electronic presentation document 220 so that the presentation can be targeted to the overall audience.

In some embodiments, the audience profile utilizes an algorithm that determines a skill level spectrum of the audience with respect to the topic of the electronic presentation document 220. For example, the audience profile can indicate a skill level of "expert" for 80% of the audience with the remaining 20% having a skill level of "novice".

The suggestion component 140 identifies one or more suggestion(s) for the electronic presentation document 220 using an algorithm utilizing stored historical data, the determined audience profile and received information regarding the topic of the electronic presentation document 220. In some embodiments, the suggestion component 140 employs one or more machine learning algorithms including linear regression algorithms, logistic regression algorithms, decision tree algorithms, support vector machine (SVM) algorithms, Naive Bayes algorithms, a K-nearest neighbors (KNN) algorithm, a K-means algorithm, a random forest algorithm, dimensionality reduction algorithms, and/or a Gradient Boost & Adaboost algorithm.

In some embodiments, the stored historical data can be updated based upon feedback information received from the user 250 and/or other user(s) regarding suggestion(s) provided by the system 100. For example, in a cloud-based scenario, with the consent of each of a plurality of users (e.g., opt-in) and in a privacy-preserving manner with personally identifiable information removed and/or hidden, the historical data can include feedback information received from the plurality of users regarding a plurality of topics. This historical data can be utilized by the suggestion component 140 in order to more accurately determine suggestion(s) for the electronic presentation document 220.

In some embodiments, the algorithm provides a plurality of suggestions ranked by probability (e.g., confidence factor) that a particular suggestion would be helpful for this particular user 250 in the electronic presentation document 220. In some embodiments, only one suggestion is presented. In some embodiments, a threshold quantity of suggestions (e.g., three) are presented.

In some embodiments, suggestion(s) having a probability (e.g., confidence factor) greater to or equal than a threshold are presented. In some embodiments, the threshold is predetermined (e.g., 90%). In some embodiments, the threshold is dynamically determined (e.g., based on content added, length of time electronic presentation document 220 is open, user feedback, etc.). For example, the threshold can be dynamically adjusted based on a quantity of content added to the electronic presentation document 220. When the user 250 is beginning an electronic presentation document 220, the suggestion component 140 can provide a greater quantity of suggestions to assist the user in developing the electronic presentation document 220. As content is added to the electronic presentation document 220, the threshold can be adjusted so that only suggestions(s) meeting or exceeding a higher threshold (e.g., higher probability) are provided to the user 250.

In some embodiments, the suggestion includes a particular template for the electronic presentation document 220. For example, based upon the determined audience profile, the suggestion component 140 can determine that individual(s) within an organizational hierarchy are expected participate. Based upon the individual(s) rank (e.g., CEO) within the organization hierarchy and the stored historical data, the suggestion component 140 can suggest appropriate template(s) for use when presenting to individual(s) of the particular organization hierarchical rank.

In some embodiments, the suggestion includes formatting for the electronic presentation document 220. For example, based upon the determined audience, historical data and received information regarding the topic of the electronic presentation document 220, the suggestion component 140 can suggest one or more font(s), style(s), image(s), bulleting style(s), etc. that are and/or are not appropriate for use with this particular audience and/or content.

In some embodiments, the suggestion includes content for the electronic presentation document 220. For example, based upon the determined audience, historical data and received information regarding the topic of the electronic presentation document 220, the suggestion component 140 can suggest that certain abbreviation(s) are or are not appropriate for use with this particular audience.

The suggested content can further be based upon an analysis of a skill level of the audience with respect to the content. For example, the suggestion component 140 can determine that a portion of the audience greater than or equal to a threshold has a particular skill level with respect to the topic (e.g., novice, intermediate, expert, etc.). Based upon this determination, the suggestion component 140 can suggest that more and/or less information be included in the electronic presentation document 220. In this manner, an audience with less skill regarding the topic can be presented with greater in-depth information, while an audience with greater skill regarding the topic can be presented with less background information.

The suggestion component 140 can provide the suggestion to the user 250. In some embodiments, the suggestion can be provided to the user via a display. In some embodiments, the suggestion can be provided to the user via a speaker.

In some embodiments, suggestion(s) can be provided by the system 100 dynamically periodically, and/or in response to change(s) in participant(s), topic, and/or information regarding the topic (e.g., content). In some embodiments, as the user 250 is entering content into the electronic presentation document 220 (e.g., slides), the system 100 can dynamically suggest additional content in response to the entered content. In some embodiments, in response to the user 250 providing additional information regarding participant(s), changing information regarding participant(s), and/or removing participant(s), the system 100 can dynamically make suggestion(s) (e.g., regarding content, template(s), and/or formatting).

In some embodiments, the system 100 can periodically provide suggestion(s). For example, in response to expiration of a predetermined period of time (e.g., minutes, hours, days, weeks, etc.), the system 100 can provide dynamically suggest content, template, and/or formatting. For example, in response to expiration of the predetermined period time, the participant profile component 120 can retrieve current participant profile information associated with at least some of the participant(s). Additionally and/or alternatively, the audience profile component 130 can determine a current audience profile relative to the topic of the electronic presentation document 220 using the retrieved participant profile information and current received information regarding the topic of the electronic presentation document 220.

Figure 3:
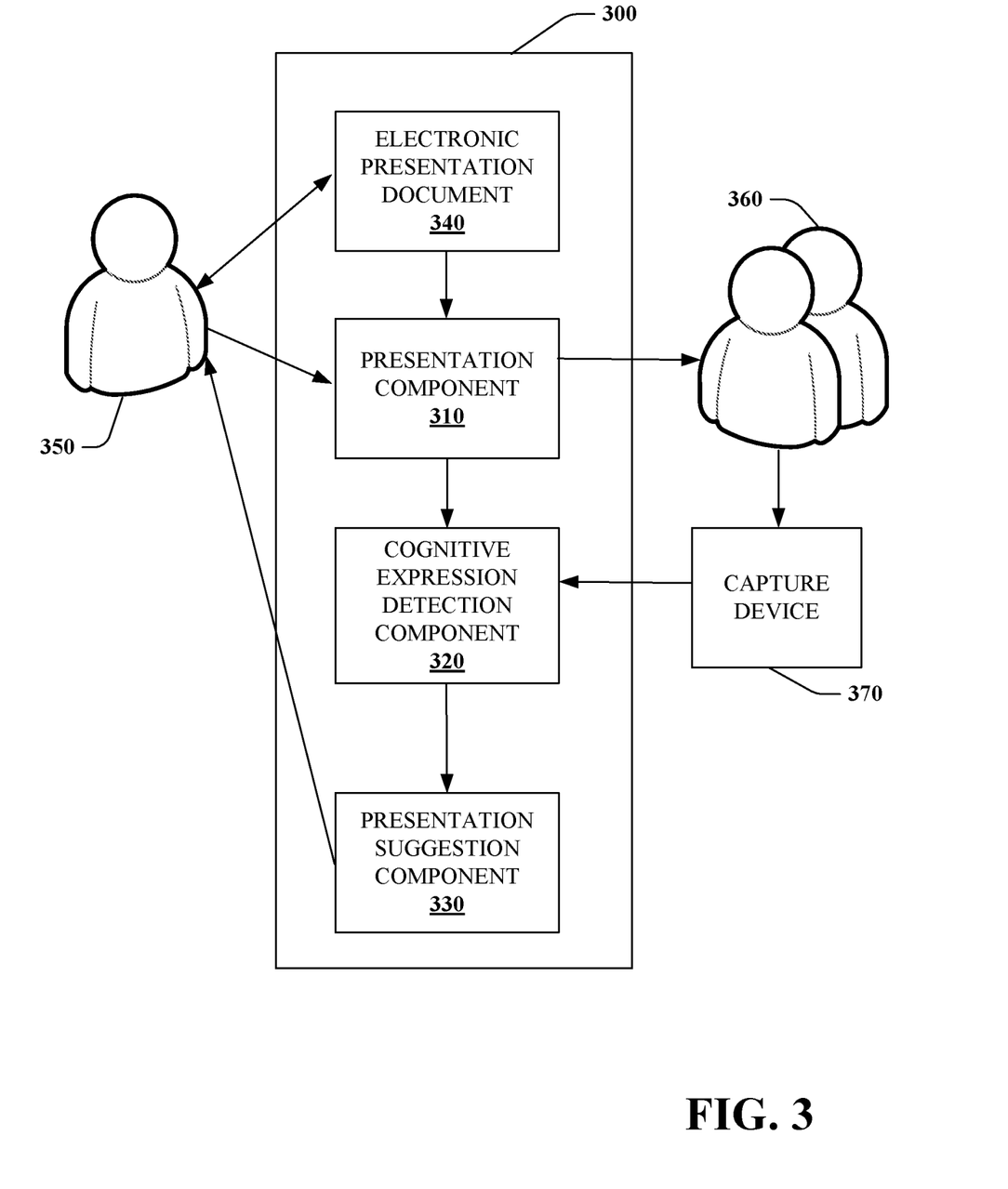
FIG. 3 is a functional block diagram that illustrates a presentation adaptation system.

Turning to FIG. 3, a presentation adaptation system 300 is illustrated. The system 300 includes a presentation component 310, a cognitive expression detection component 320, and a presentation suggestion component 330. The system 300 can dynamically adapt an electronic presentation document based upon detected cognitive expression(s) of at least some of the participant(s). The system 300 can provide a suggestion (e.g., regarding more and/or less content) to a presenter based upon the detected cognitive expression(s).

Figure 4:
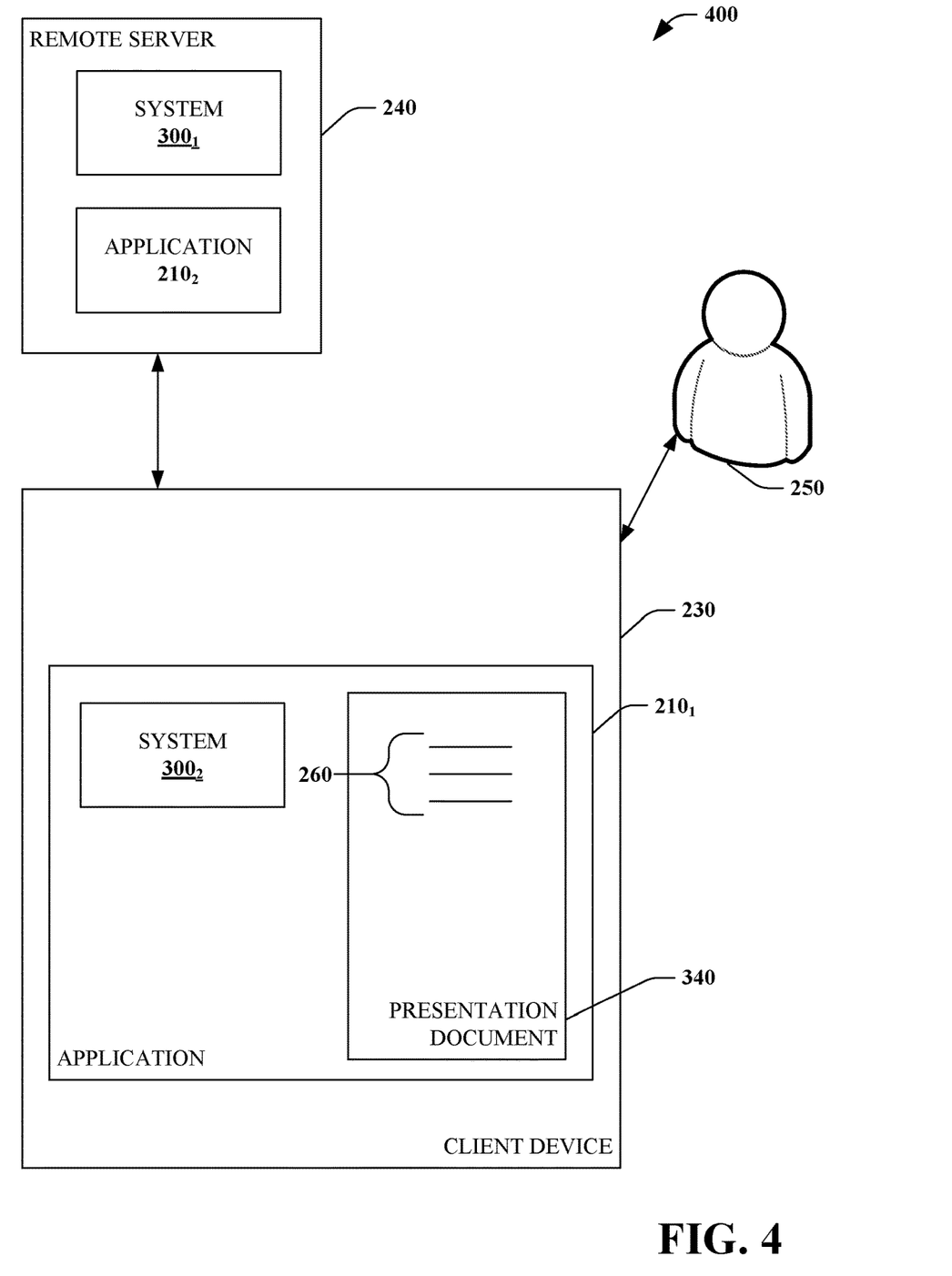
FIG. 4 is a functional block diagram that illustrates a system for displaying an electronic presentation document.

Referring briefly to FIG. 4, a system for displaying an electronic presentation 400 document is illustrated. The system 400 includes an application $210_1$, $210_2$ (generally, 210) used to view, generate, and/or edit an electronic presentation document 340. Examples of suitable applications 210 include, but are not limited to, word processing, spreadsheet, database, slide presentation, electronic mail, drawing, note taking, web browser, media player, and game applications. The application 210 can be a thick client application and/or a thin client application, as discussed previously.

Referring to FIG. 3, with continued reference to FIG. 4, the presentation component 310 presents (e.g., displays and/or audibly via text-to-speech) an electronic presentation document 340 to one or more participants by a presenter 350. As the electronic presentation document 340 is being presented to the one or more participants 360, the cognitive expression detection component 320 gathers information regarding cognitive expression(s) of one or more participants 360.

In some embodiments, the information regarding cognitive expression(s) is obtained with express consent of the one or more participants 360 (e.g., opt-in). In some embodiments, the cognitive expression detection component 320 continually gathers information regarding cognitive expression(s). In some embodiments, the cognitive expression detection component 320 gathers information regarding cognitive expression(s) at specific time intervals (e.g., one minute, five minutes, etc.).

In some embodiments, the information regarding cognitive expression(s) is provided by one or more capture device(s) 370. The capture device(s) 370 can include Microsoft Kinect® depth camera(s), digital camera(s), three-dimensional camera(s), movement detector(s), microphone(s) and the like. In some embodiments, the capture device(s) 370 are component(s) of computer system(s) of particular participant(s) 360.

In some embodiments, detection by the cognitive expression detection component 320 can based upon audio, user's movement(s), gesture(s), posture(s) and/or facial expression(s) while the users 360 are viewing the electronic presentation document 340. For example, the gestures, postures and/or movements can include detecting if a particular user 360 moves away from the field of view of the capture device 370 while viewing the presentation, stays within the field of view of the capture device 370, face an audio visual device or leans forward or talks to the display screen while viewing the presentation. Similarly, facial expressions tracked by the capture device 370 can include detecting smiles, laughter, cries, frowns, yawns or applauses from a particular user 360 while the particular user 360 view the presentation.

In some embodiments, the information regarding cognitive expression(s) is obtained passively without specific feedback information from a user during the presentation (e.g., the user previously opting-in to sharing cognitive expression information for the particular presentation). In some embodiments, the information regarding cognitive expression(s) is obtained passively, but only utilized by the cognitive expression detection component 320 with permission of a particular user 360. In response to detecting a particular expression of the particular user 360 (e.g., confusion), the system 300 can prompt the particular user 360 for permission to share the detected particular expression with the system 300. For example, the system 300 can prompt the particular user "It appears that you may be confused about the material currently being presented. Please click "share" if you would like to presenter to be made aware of your confusion."

Based upon the received information regarding cognitive expression(s), using an algorithm, the cognitive expression detection component 320 can determine an engagement level of the participants 360 (e.g., bored, confused, interested, etc.). The cognitive expression detection component 320 can provide the engagement level to the presentation suggestion component 330.

In some embodiments, the cognitive expression detection component 320 aggregates the gathered information regarding cognitive expression in a privacy-preserving manner, removing personally identifiable information. For example, when the cognitive expression detection component 320 determines that more than a threshold quantity of participants 360 are confused, the cognitive expression detection component 320 can provide information indicating participant confusion to the presentation component 330

Based upon the engagement level, the presentation suggestion component 330 can provide one or more suggestions to the presenter 350. For example, the presentation suggestion component 330 can provide a visual and/or audio suggestion(s) prompt to the presenter 350 indicating the participants 360 are confused, bored, interested, etc. with respect to the material currently being presented.

In some embodiments, the presentation suggestion component 330 can identify one or more slides of the electronic presentation document 340 the presenter may desire to skip based upon the engagement level and/or time concerned. In some embodiments, the presentation suggestion component 330 can hide content of one or more slides of the electronic presentation document 340 from displays of the participants 360 while providing an indication of the hidden content on a display of the presenter 350.

In some embodiments, the presentation suggestion component 330 can provide visual and/or audio suggestion(s) of additional content to the presenter 350. In response to the engagement level (e.g., confused, engaged, bored, etc.), the presentation suggestion component 330 can dynamically identify additional content to be included in the electronic presentation document 340. The presentation suggestion component 330 can then provide the additional content as a suggestion to the presenter 350. The presenter 350 can then decide to include the additional content in the electronic presentation document 340, include at least some of the additional content in a verbal narrative accompanying the presentation and/or ignore the additional content.

In some embodiments, information regarding suggestion(s) provided by the presentation suggestion component 330 and/or action(s) taken by the presenter 350 can be utilized by the algorithm of the cognitive expression detection 320 to adaptively provide suggestion(s) for the current presentation and/or future presentation(s). In some embodiments, information regarding suggestion(s) provided by the presentation suggestion component 330 and/or action(s) taken by the presenter 350 can be utilized by the algorithm of the suggestion component 140.

Figure 5:
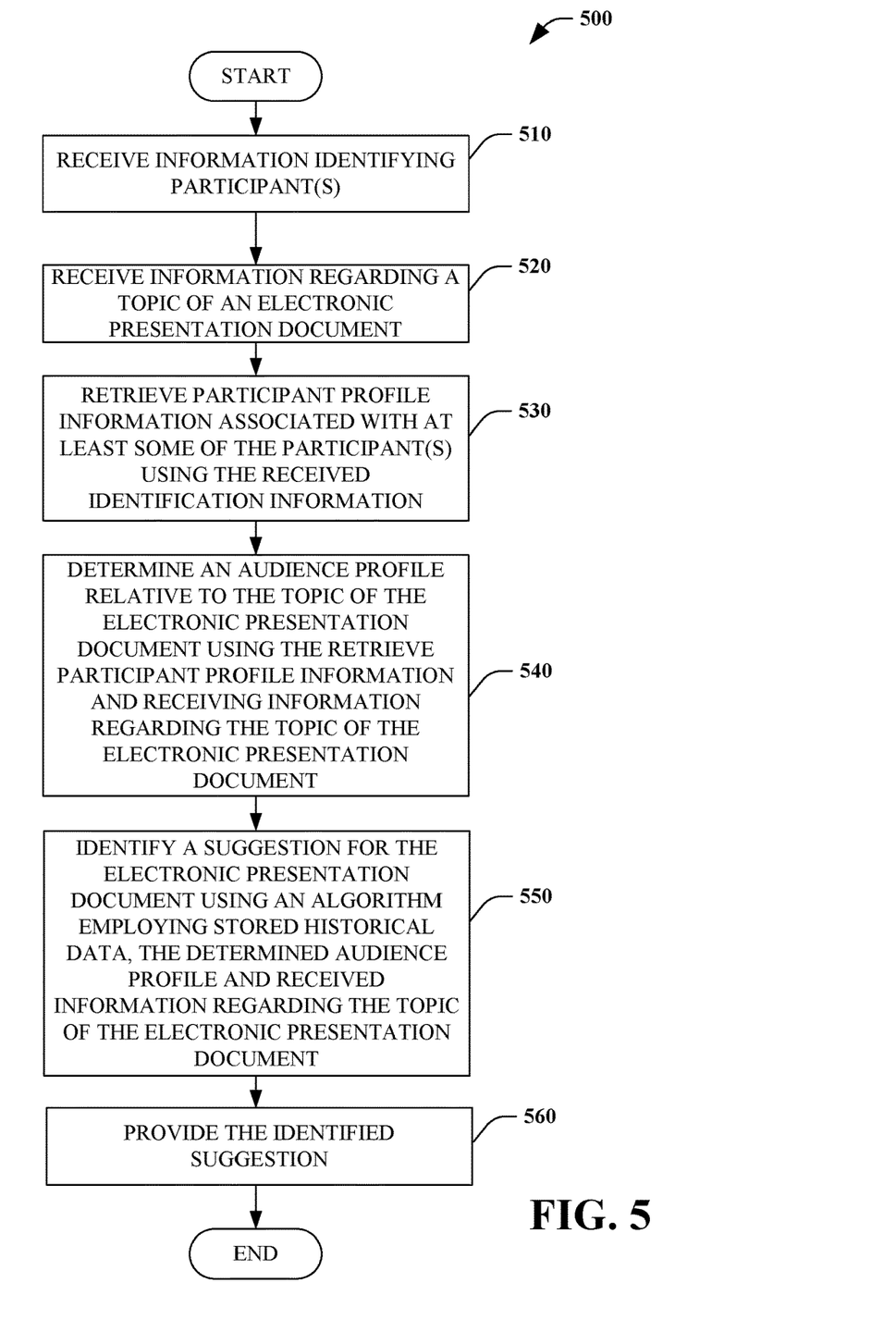
FIG. 5 illustrates an exemplary method of creating an electronic presentation document.

FIGS. 4 and 5 illustrate exemplary methodologies relating creating an electronic presentation document tailored to a particular audience and/or adapting the electronic presentation document based upon cognitive feedback. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 5, a method of creating an electronic presentation document 500 is illustrated. In some embodiments, the method 500 is performed by the system 100. In some embodiments, at least some of acts of method 500 are performed during editing of an electronic presentation document using an application.

At 510, information identifying one or more participants associated with the electronic presentation document is received. For example, the information can be received during editing of the electronic presentation document using an application.

At 520, information regarding a topic of the electronic presentation document is received. At 530, participant profile information associated with at least some of the one or more participants is retrieved using the received identification information. At 540, an audience profile relative to the topic of the electronic presentation document is determined using the retrieved participant profile information and received information regarding the topic of the electronic presentation document.

At 550, a suggestion for the electronic presentation document is identified using an algorithm employing stored historical data, the determined audience profile and received information regarding the topic of the electronic presentation document. At 560, the suggestion is provided (e.g., displayed) to a user.

Figure 6:
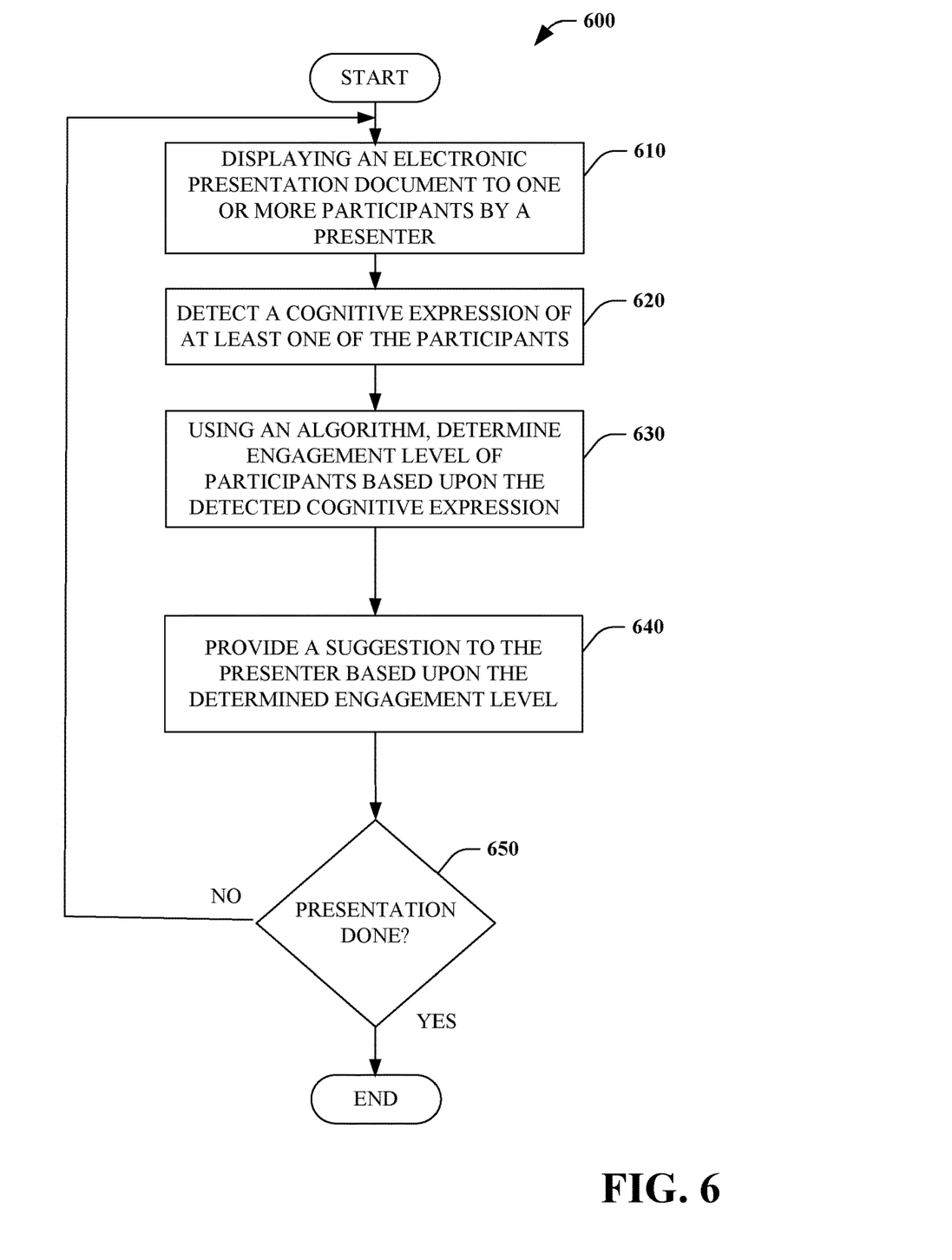
FIG. 6 illustrates an exemplary method of adapting an electronic presentation document.

Turning to FIG. 6, a method of adapting an electronic presentation document 600 is illustrated. In some embodiments, the method 600 is performed by the system 300. At 610, an electronic presentation document is displayed to one or more participants by a presenter. At 620, a cognitive expression of at least one of the participants is detected. At 630, using an algorithm, an engagement level of the participants is determined based upon the detected cognitive expressions.

At 640, a suggestion is provided to the presenter based upon the determined engagement level. At 650, a determination is made as to whether the presentation is done. If the determination at 650 is NO, processing continues at 610. If the determination at 650 is YES, no further processing occurs.

Described herein is a smart presentation system, comprising: a computer comprising a processor and a memory having computer-executable instructions stored thereupon which, when executed by the processor, cause the computer to: while editing an electronic presentation document using a presentation application: receive information identifying one or more participants associated with the electronic presentation document; receive information regarding a topic of the electronic presentation document; retrieve participant profile information associated with at least some of the one or more participants using the received identification information; determine an audience profile relative to the topic of the electronic presentation document using the retrieved participant profile information and received information regarding the topic of the electronic presentation document; identify a suggestion for the electronic presentation document using an algorithm employing stored historical data, the determined audience profile and received information regarding the topic of the electronic presentation document; and provide the suggestion to a user.

The system can further include wherein the information identifying one or more participants associated with the electronic presentation document is received implicitly from at least one of an email message, a text message or an electronic communication associated with the electronic presentation document. The system can include wherein the information regarding the topic of the electronic presentation document is received implicitly from at least one of an email message, a text message or an electronic communication associated with the electronic presentation document.

The system can further include wherein the suggestion comprises content regarding the topic of the electronic presentation document. The system can include wherein the suggestion comprises a template to be used for the electronic presentation document. The system can further include wherein the participant profile information comprises at least one of a skill set of at least some of the participants or an organizational role of at least some of the participants.

The system can include wherein the audience profile comprises an aggregated skill level of the participants with respect to the topic of the electronic presentation document. The system can further include the memory having further computer-executable instructions stored thereupon which, when executed by the processor, cause the computer to: receive feedback from the user; and updating the stored historical data based upon the received feedback. The system further include wherein determine an audience profile comprises utilizing an algorithm that determines an aggregated skill level of the participants with respect to the topic of the electronic presentation document.

Described herein is a method of creating an electronic presentation document, comprising: during editing of the electronic presentation document using an application, receiving information identifying one or more participants associated with the electronic presentation document; receiving information regarding a topic of the electronic presentation document; retrieving participant profile information associated with at least some of the one or more participants using the received identification information; determining an audience profile relative to the topic of the electronic presentation document using the retrieved participant profile information and received information regarding the topic of the electronic presentation document; identifying a suggestion for the electronic presentation document using an algorithm employing stored historical data, the determined audience profile and received information regarding the topic of the electronic presentation document; and providing the suggestion to a user.

The method can further include wherein the information identifying one or more participants associated with the electronic presentation document is received implicitly from at least one of an email message, a text message or an electronic communication associated with the electronic presentation document. The method can include wherein the information regarding the topic of the electronic presentation document is received implicitly from at least one of an email message, a text message or an electronic communication associated with the electronic presentation document. The method can further include wherein the suggestion comprises content regarding the topic of the electronic presentation document.

The method can include wherein the participant profile information comprises at least one of a skill set of at least some of the participants or an organizational role of at least some of the participants. The method can further include wherein the audience profile comprises an aggregated skill level of the participants with respect to the topic of the electronic presentation document. The method can include receiving feedback from the user; and updating the stored historical data based upon the received feedback.

Described herein is a computer storage media storing computer-readable instructions that when executed cause a computing device to: while presenting an electronic presentation document to one or more participants by a presenter, detect a cognitive expression of at least one participants; using an algorithm, determine an engagement level of the one or more participants based upon the detected cognitive expression; and, provide a suggestion to the presenter based upon the determined engagement level. The computer storage media can further include wherein the suggestion comprises information of which the engagement level is indicative of a lack of understanding.

The computer storage media can include wherein the suggestion is provided to the presenter at least one of visually or audibly. The computer storage media can further include wherein content of the electronic presentation document is updated based upon the detected cognitive expression.

Figure 7:
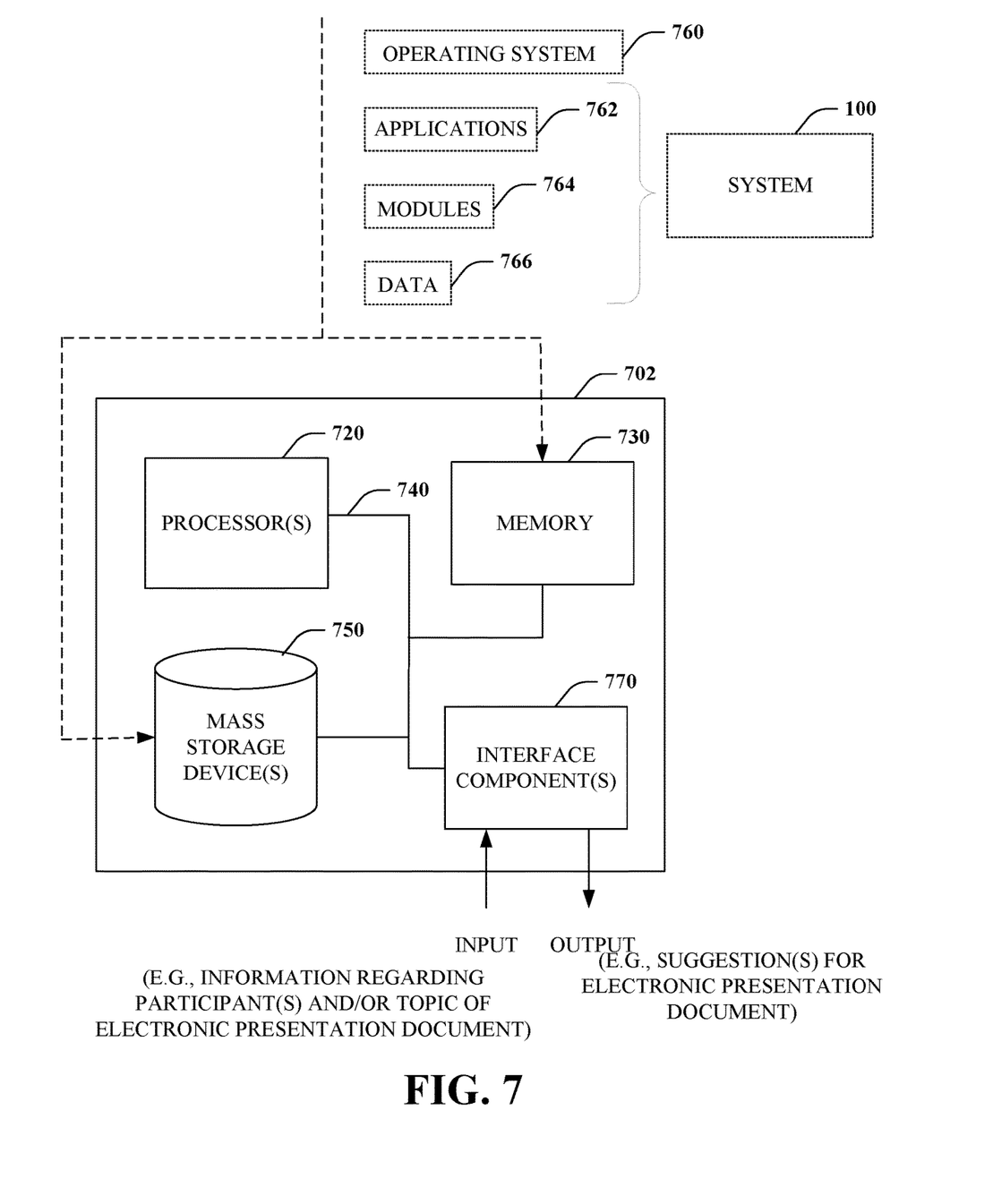
FIG. 7 is a functional block diagram that illustrates an exemplary computing system.

With reference to FIG. 7, illustrated is an example general-purpose computer or computing device 702 (e.g., mobile phone, desktop, laptop, tablet, watch, server, handheld, programmable consumer or industrial electronics, set-top box, game system, compute node, etc.). For instance, the computing device 702 may be used in a smart presentation system 100 and/or a presentation adaptation system 300.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a computer comprising a processor and a memory having computer-executable instructions stored thereupon which, when executed by the processor, cause the computer to:
   receive, based at least on input from an editing user when editing an electronic presentation document using a presentation application:
      identification information identifying expected participants that are expected to view the electronic presentation document; and
      document topic information regarding a document topic of the electronic presentation document;
   retrieve participant profile information associated with at least some of the expected participants using the received identification information;
   determine an audience profile relative to the document topic of the electronic presentation document using the retrieved participant profile information and the received document topic information, the audience profile reflecting an aggregated skill level of the expected participants with respect to the document topic;
   based at least on the aggregated skill level of the expected participants with respect to the document topic, identify additional suggested content for the editing user to add to the electronic presentation document; and
   output the additional suggested content to the editing user.

2. The system of claim 1, wherein the identification information identifying the expected participants is received from at least one of an email message, a text message, or an electronic communication associated with the electronic presentation document.

3. The system of claim 1, wherein the document topic information regarding the document topic of the electronic presentation document is received from at least one of an email message, a text message, or an electronic communication associated with the electronic presentation document.

4. The system of claim 1, wherein the additional suggested content comprises in-depth information regarding the document topic.

5. The system of claim 1, the memory having further computer-executable instructions stored thereupon which, when executed by the processor, cause the computer to:
   based at least on the identification information or the document topic information, identify a suggested template to be used for the electronic presentation document; and
   output the suggested template to the editing user.

6. The system of claim 1, wherein the participant profile information comprises at least one of a skill set of at least some of the expected participants or an organizational role of at least some of the expected participants.

7. The system of claim 1, the memory having further computer-executable instructions stored thereupon which, when executed by the processor, cause the computer to:
   using an algorithm, perform a ranking of a plurality of potential instances of additional suggested content; and based at least on the ranking, output a subset of the plurality of potential instances of additional suggested content to the editing user.

8. The system of claim 1, the memory having further computer-executable instructions stored thereupon which, when executed by the processor, cause the computer to:
identify the additional suggested content based at least on stored historical data reflecting user feedback for previous suggested content.

9. The system of claim 1, the memory having further computer-executable instructions stored thereupon which, when executed by the processor, cause the computer to:
utilize an algorithm to determine the aggregated skill level of the expected participants with respect to the document topic of the electronic presentation document.

10. A method of creating an electronic presentation document, the method comprising:
receiving, based at least on input from an editing user that edits the electronic presentation document, identification information identifying expected participants that are expected to view the electronic presentation document after editing;
receiving document topic information regarding a document topic of the electronic presentation document;
retrieving participant profile information associated with at least some of the expected participants using the received identification information;
determining an audience profile relative to the document topic of the electronic presentation document using the retrieved participant profile information and the received document topic information, the audience profile reflecting an aggregated skill level of the expected participants with respect to the document topic;
based at least on the aggregated skill level of the expected participants with respect to the document topic, identifying additional suggested content to add into the electronic presentation document; and
outputting the additional suggested content to the editing user.

11. The method of claim 10, wherein the identification information identifying the expected participants is received from at least one of an email message, a text message, or an electronic communication associated with the electronic presentation document.

12. The method of claim 10, wherein the document topic information regarding the document topic of the electronic presentation document is received from at least one of an email message, a text message, or an electronic communication associated with the electronic presentation document.

13. The method of claim 10, wherein the additional suggested content comprises in-depth information regarding the document topic of the electronic presentation document.

14. The method of claim 10, wherein the participant profile information comprises at least one of a skill set of at least some of the expected participants or an organizational role of at least some of the expected participants.

15. The method of claim 10, further comprising:
selecting the additional suggested content from a plurality of instances of potential additional suggested content based at least on probabilities or confidence factors associated with respective instances of potential additional suggested content.

16. The method of claim 10, further comprising:
identifying the additional suggested content based at least on stored historical data reflecting user feedback for previous suggested content.

17. A computer storage media storing computer-readable instructions that, when executed, cause a computing device to:
receive identification information identifying expected participants that are expected to view an electronic presentation document in the future;
receive document topic information regarding a document topic of the electronic presentation document;
retrieve participant profile information associated with at least some of the expected participants using the received identification information;
determine an audience profile relative to the document topic of the electronic presentation document using the retrieved participant profile information and the received document topic information regarding the document topic of the electronic presentation document, the audience profile reflecting an aggregated skill level of the expected participants;
prior to completion of editing of the electronic presentation document by an editing user, identify additional suggested content for adding into electronic presentation document based at least on the aggregated skill level of the expected participants with respect to the document topic; and
provide the additional suggested content to the editing user.

18. The computer storage media of claim 17, wherein the identification information identifying the expected participants is received from at least one of an email message, a text message, or an electronic communication associated with the electronic presentation document.

19. The computer storage media of claim 17, wherein the document topic information regarding the document topic of the electronic presentation document is received from at least one of an email message, a text message, or an electronic communication associated with the electronic presentation document.

20. The computer storage media of claim 17, wherein the electronic presentation document comprises a plurality of slides to be presented to the expected participants after completion of editing of the electronic presentation document by the editing user.

* * * * *